May 19, 1953　　　J. R. RAUHUT　　　2,638,644
AIR-CONDITIONING AND HUMIDIFYING APPARATUS
Filed Oct. 25, 1947　　　3 Sheets-Sheet 1
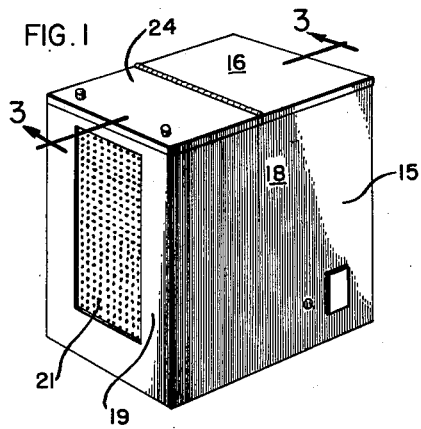
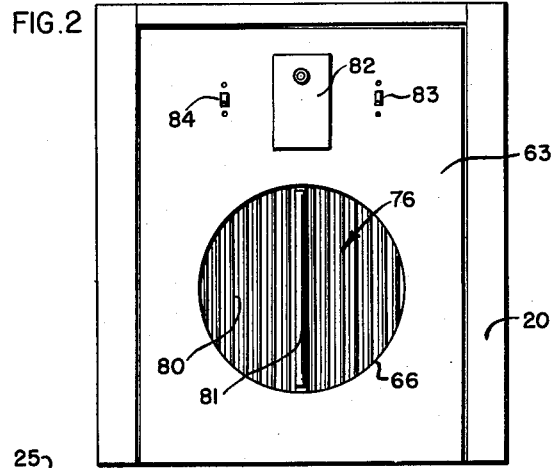
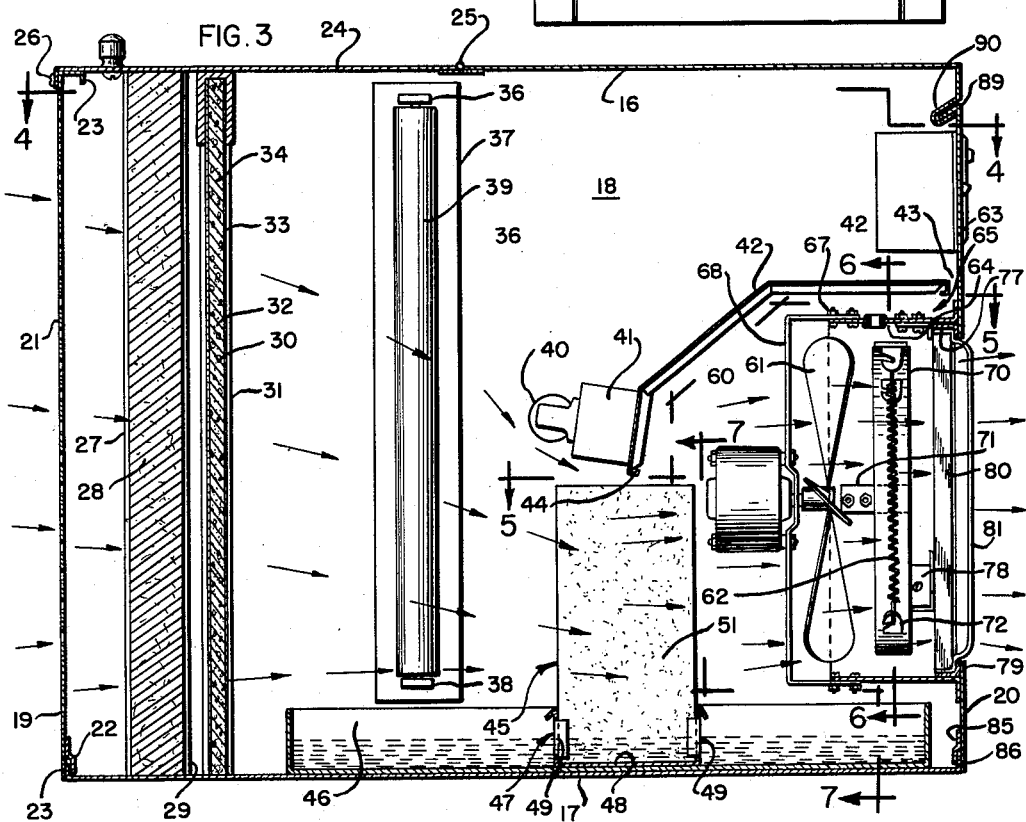
INVENTOR
JOHN R. RAUHUT
BY
Joshua R.H. Potts
HIS ATTORNEY May 19, 1953 J. R. RAUHUT 2,638,644
AIR-CONDITIONING AND HUMIDIFYING APPARATUS
Filed Oct. 25, 1947 3 Sheets-Sheet 2
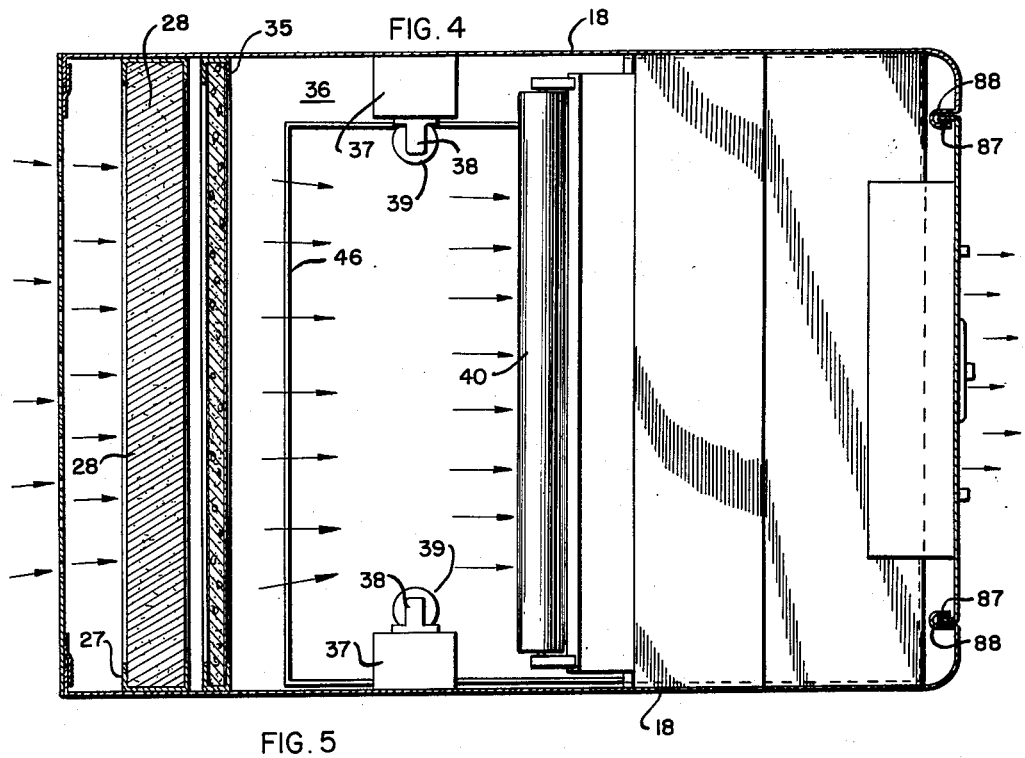
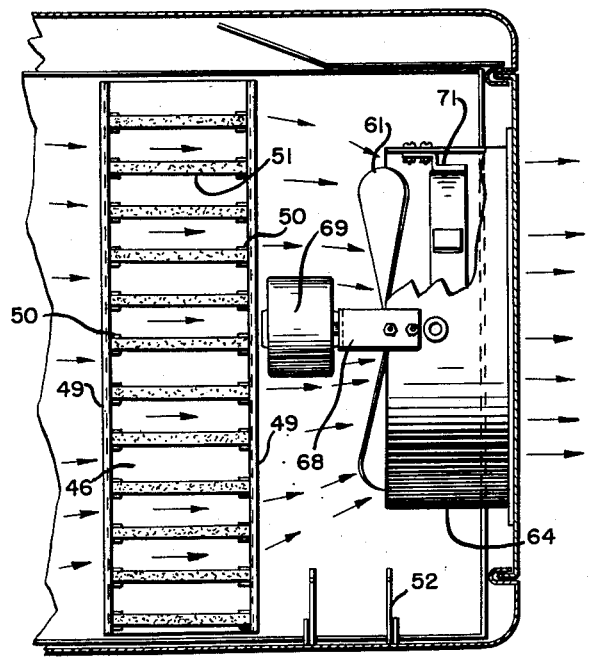
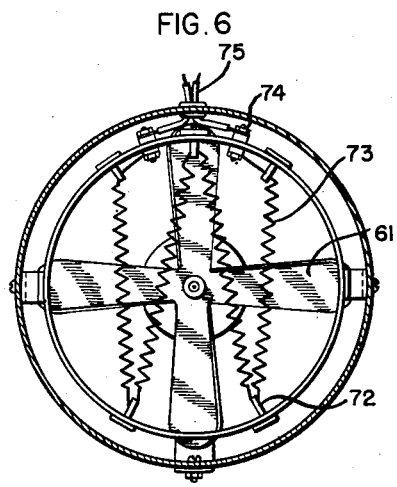
INVENTOR
JOHN R. RAUHUT
BY
Joshua R. H. Patts
HIS ATTORNEY May 19, 1953     J. R. RAUHUT     2,638,644
AIR-CONDITIONING AND HUMIDIFYING APPARATUS
Filed Oct. 25, 1947     3 Sheets-Sheet 3
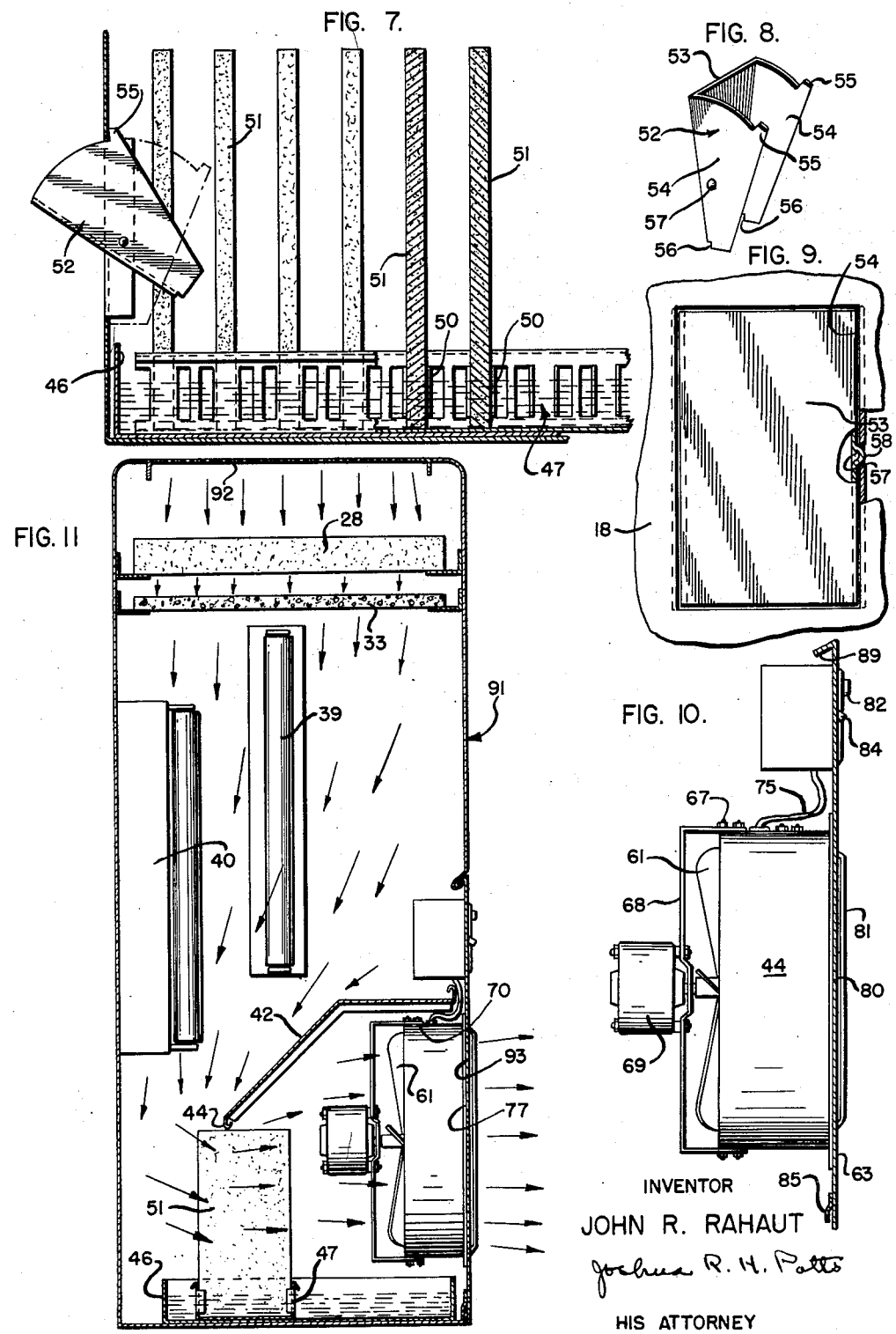
INVENTOR
JOHN R. RAHAUT
Joshua R. H. Potts
HIS ATTORNEY Patented May 19, 1953

2,638,644

UNITED STATES PATENT OFFICE 2,638,644

AIR-CONDITIONING AND HUMIDIFYING APPARATUS

John R. Rauhut, Chicago, Ill.

Application October 25, 1947, Serial No. 782,205

3 Claims. (Cl. 21—74)

This invention relates to air conditioning and humidifying apparatus, and has for an object the provision of new and improved apparatus of this character.

Another object of the invention is to provide a small portable, compact, and self-contained unit, having operative provisions housed in a small casing, for inducing passage of air through the casing, and wherein means are included to purify, heat, and humidify the air before its emergence into the space to be conditioned.

Still another object of the invention is to treat the air traversing the casing in such a manner that all foreign matter, odors, bacteria, and the like, are abstracted or rendered innocuous, and the air subsequently humidified and heated, so that upon emergence from the casing, the air is not only conditioned with respect to temperature, but is healthful and pure, and continuous operation of the apparatus serves to quickly condition and purify all of the air within a room or office or other space to be conditioned.

A more particular object of the invention is to provide means in an apparatus of this character which includes a chamber, traversed by the air, and in which ultra-violet lamps are positioned to destroy many types of bacteria which normally pollute the air in an occupied space, and wherein the ultra-violet lamps are proportioned in energy output to the size of the chamber, and to the volume of air passing therethrough, to thereby render said air substantially sterile or free from harmful bacteria.

A further object of the invention is to provide in conjunction with the bacteria destroying chamber, filters for removing foreign matter and odors entrained with the air entering the apparatus.

A still further object of the invention is to provide novel means for humidifying the air without vaporizing or heating the humidifying agent, preferably after the air has been purified, and heating the air independently of, and after the air has been humidified, and before it emerges from the casing.

Still another object of the invention is to provide a casing having means by which the various conditioning provisions may be individually readily assembled or disassembled in predetermined relation with respect to the casing, so that renewal or replacement of the operative provisions may be readily effected should this become necessary.

Other and further objects of the invention will appear from the specification and from the claims thereto annexed, and from the accompanying drawings, in which:

Figure 1 is a perspective view of the portable unit embodying the invention,

Figure 2 is an enlarged front elevational view of the portable unit,

Figure 3 is an enlarged vertical sectional view corresponding substantially to line 3—3 of Figure 1, Figure 4 is a horizontal sectional view corresponding substantially to the line 4—4 of Figure 3, Figure 5 is a fragmentary horizontal sectional view corresponding substantially to the line 5—5 of Figure 3, Figure 6 is a fragmentary vertical sectional view corresponding substantially to the line 6—6 of Figure 3, Figure 7 is an enlarged transverse sectional view of a portion of the apparatus corresponding substantially to the line 7—7 of Figure 3, Figure 8 is an enlarged perspective view of the pivoted closure chute employed in connection with the invention, Figure 9 is an enlarged elevational view, partly in section, showing the manner in which the closure chute is mounted, Figure 10 is a sectional view of the detachable front panel of the apparatus, showing the motor and fan unit assembled therewith, while, Figure 11 shows a vertical sectional view of a different embodiment of the invention.

As shown in the drawings, the invention comprises a relatively small portable unit, such as is shown in Figure 1, wherein all operative parts are enclosed within a housing or casing, indicated generally at 15. The housing 15 preferably is made up of sheet metal, and includes top wall 16, bottom wall 17, side walls 18—18, rear end wall 19, and front end wall 20. The rear wall 19 is perforated to provide a grill inlet 21, giving access of incoming air to the interior of the housing 15.

The rear wall 19 preferably is provided along its bottom edge with brackets 22, defining recesses into which extends upturned flange 23 formed on the adjacent edge of the bottom wall 17. The upper end of the rear wall 19 is formed in channel shape, as indicated at 23. A door 24 is hinged as at 25, to the top wall 16, and has an edge flange overlying the channel 23, the door 24 normally being held closed by screws 26. The screws 26 may be unscrewed, and the door 24 opened to give access to the interior of the casing 15, and to release the wall 19.

Spaced inwardly from the end wall 19, side walls 18—18 are provided with inwardly turned channel members 27, providing grooves for the slidable reception of a filtering medium 28, the lower edge of which is adapted to rest upon the floor or bottom wall 17 of the housing. The filtering medium 28 may comprise matted fibrous material of any well known type, and through which incoming air readily passes, the air being cleansed of foreign matter, such as dust, and the like.

Spaced somewhat inwardly from the filter medium 28 is an odor absorbing filtering medium 30. This filter is adapted to be accommodated within channel shaped guides 31 of a type similar to the guides 27. The filter itself may comprise a thin box-like container 32, the side walls of which are provided with small perforations 33, and the interior of which is filled with granular activated carbon material 34, suitable for the purpose. Since the granular material is likely to sift down within the container, a channel-shaped cap or cover is employed to overlap the open edges of the perforated plates a considerable distance so that passage of air cannot take place freely between the upper edge of the container and the level of the contents, but must pass through the filtering medium at all times.

Forwardly of the filtering medium 30 there is provided a sterilizing chamber 36 into which the air passes after traversing the filtering elements 28 and 30. Within the chamber 36, and affixed to the inner surfaces of the opposite side walls 18—18 are vertically disposed brackets 37, each carrying spaced electrodes 38, adapted for the reception of the ends of tubular ultra-violet ray lamps 39.

A third lamp 40 of the same character may extend transversely of the chamber 36, somewhat in advance of the lamps 39, the bracket 44 for supporting the lamp 40 preferably being carried by an angularly shaped partition 42, extending entirely across the housing 15, and with the adjacent walls of the housing, defining the chamber 36. The forward end of the partition 42 terminates short of the front wall of the casing 15 to provide a space 43, the inner end of the partition 42 with the adjacent walls of the housing, defining a constricted outlet 44 from the sterilizing chamber 36 of a smaller area than the air inlet 21. The filtering medium 28 for catching foreign substances, the filtering medium 30 for deodorizing air, and the lamps 39 and 40 for sterilizing the air, when taken together form an air purifying means.

Located within the restricted outlet 44 is humidifying means 45. The humidifying means preferably comprises a shallow pan 46 adapted to contain a quantity of water. Disposed within the pan 46 is a rack 47 of improved construction. The rack 47 is of elongated channel-shaped sheet metal construction, extending transversely of the housing 15. The rack 47 has a bottom wall 48 adapted to rest upon the bottom of the pan 46, and side walls 49—49 which are cut out at intervals, and the cut out portions struck inwardly to provide opposed pairs of inwardly turned vertically extending channel-shaped holders 50—50, arranged at intervals along the length of the side walls 49—49. The upper margins of the side walls 49—49 are preferably turned outwardly and downwardly for reinforcing purposes.

Detachably arranged within each pair of holders 50—50 is a plate or slab 51 of absorbent, preferably of clay-like material, the bottom of each plate 51 resting upon the bottom wall 48 of the rack, and the side edges of the plate slidably fitting within the holders 50—50. The plates 51 extend upwardly in vertical relation, so as to span the distance from the pan 46 to the top of the restricted outlet 44. The plates 51 are thus spaced at intervals along the restricted opening or outlet 44 parallel to each other, and presented edgewise with respect to the travel of the air through outlet 44. The plates 51, having their lower ends immersed in the water in the pan 46, by reason of their absorbent nature, and through capillary action, draw water from the pan and take on a coating of moisture, which moisture is brushed off and entrained with the air passing over the plates, it being unnecessary to vaporize or heat the water for this purpose.

Indeed the plates 51 operate in the absence of heat, and heating means, hereinafter referred to, are removed from the plates 51, and there is no tendency of the heat to affect operation of the humidifying apparatus.

Means are provided for conveniently filling the pan 46 with water, such means taking the form of a tiltable chute 52. The chute 52 is channel-shaped in cross-section, including a bottom wall 53 and side walls 54. The side walls 54 are substantially triangular in shape, having stops 55, 55 at opposite ends for limiting movement of the chute. The side walls 54 are provided with pressed out protuberances 57 which fit into pressed sockets 58 formed in flanges 59 of the housing wall, and mount the chute 52 for pivotal movement. When it is desired to furnish water to the pan 46, the chute 52 is tilted to the position shown in Figure 7, the stops 55, 55 limiting this movement, and retaining the chute in an inclined position, so that water poured into the chute 52 will be directed into the pan 46.

When the chute is moved to a closed position, the stops 56 limit this closing movement so that in its closed position the chute seals the opening, and prevents entrance of air to the housing 15.

The partition 42, together with the adjacent walls of the housing 15, define a secondary chamber 60, communicating with the constricted outlet 44. Disposed within the chamber 60 is a motor-driven suction fan 61, and heating means 62, these members, with the panel 63, comprising a completely assembled unit. In fabricating this unit, a tubular casing 64 is employed, having an out-turned flange 65 welded to the panel 63 to dispose the casing 64 axially in line with a circular aperture 66 in the panel. Attached to the outer margins of the tubular casing 64, by bolts 67, is a bracket 68, carrying the motor 69, which drives the suction fan 61. Inwardly of the fan 61 are mounted the heating means 62. The heating means 62 comprise a ring 70 secured to the tubular casing 64 by brackets 71. Extending radially of the ring are hook-like members 72, carrying a resistant wire 73, terminal posts and feed wires being indicated at 74 and 75. Mounted to span the circular aperture 66 is a louver or vane carrying unit 76. The unit 76 is ring-like in form, as indicated at 77, and is supported for rotation within the tube 64 by brackets 78 at one side of the ring 77, and at the opposite side the ring bears against a projecting portion of the panel 63 which defines the opening 66. The vanes or louvers 80 are attached to the ring 76 and move therewith, and are disposed at an angle to affect the stream of air passing therethrough. A rib or handle 81 is provided for rotating the louver unit, as will be understood.

The portion of the panel 63, above the opening 66, carries a thermostat of any suitable type for automatically cutting in and out the heating means 73 dependent upon variations in temperature in accordance with well understood practice. A switch 83 is carried by the panel for controlling operation of the panel unit, and switch 84 is provided for controlling operation of the ultra-violet ray lamps 39 and 40.

For quickly attaching or detecting the panel with respect to the casing 15, the panel 63 along its bottom edges is provided with a plurality of brackets 85 providing recesses to receive an upturned flange 86 on the bottom wall 17 of the housing 15. The side edges of the panel 63 are flanged, as at 87, and these flanges are accommodated in formed channels 88 provided along the adjacent margins of the front wall 20. The top edge of the panel 63 is formed with an inclined flange 89 adapted to be inserted into a correspondingly shaped recess 90.

In operation, and assuming the panel unit, and the members 39 and 40 to be energized, air is drawn from the space to be conditioned through the perforated grill 21 into the interior of the casing 15. Incoming air first encounters the filtering medium 28, which intercepts all dust and foreign particles entrained with the air stream. The air then passes freely through the filtering medium 30 of activated carbon, which removes other foreign matter from the air stream such as gases, odors, and the like. The air then enters the sterilizing chamber 36, being momentarily slowed down in this chamber, and subjected to the effect of the ultra-violet lamps 39 and 40 which destroy germs and bacteria of various kinds. The air leaving the chamber 36 passes partially through the space 43, which prevents the same being trapped in the upper portion of the chamber 36, but the major portion of the air passes through the restricted opening 44, which acting in the manner of a venturi, increases its velocity. As the air passes through the opening 44 it brushes along the broad surfaces of the absorbing plates 51, which through capillary action have drawn moisture from the pan of water 46. After passing the plates 51, the air enters the chamber 60, and is drawn through the tubular casing 64 by the fan 61, and through and about the coils of the heating means before emergence from the casing through the louvers 80. Rotation of the louver carrying ring 77 disposes the inclined louvers in different positions, so that the stream of air may be directed in any desired direction.

A somewhat different embodiment of the invention is illustrated in Figure 11, the casing 91 being of a vertical type, having an air inlet at the top, as indicated at 92, and air outlet at the lower portion of one side, as indicated at 93; otherwise, except for their different positions, all other provisions are the same, and will be indicated by the same reference numerals used in connection with the like parts already described.

While I have illustrated and described the preferred form of construction for carrying my invention into effect, this is capable of variation and modification without departing from the spirit of the invention, I, therefore, do not wish to be limited to the precise details of construction set forth, but desire to avail myself of such variations and modifications as come within the scope of the appended claims.

Having described my invention, I claim:

1. A construction of the character described, comprising: a casing having an air inlet and an air outlet; means for inducing passage of air through said casing; means within said casing defining an opening that is restricted as compared to said air inlet and through which said air must pass; and humidifying means comprising a liquid absorbent element disposed in said restricted opening, and in the path of said air, and having an end portion communicating with a source of liquid; said absorbent element being in the form of a stationary flat plate disposed edgewise to the direction of air passing thereover.

2. A health conditioner, comprising: a portable cabinet adapted to be disposed in a room or space to be heated, and having an air inlet and an air outlet; a filtering member adjacent to said inlet through which said entering air must pass, said filtering member being adapted to intercept dust and other foreign matter; a second filtering device spaced from said first member and including activated carbon for filtering out odors and the like from said air; a sterilizing chamber into which said air passes, said chamber having ultra-violet ray lamps for destroying germs and other bacteria; means for constricting the outlet from said sterilizing chamber, to slow down passage of air within said chamber and speed up air issuing from said constriction; humidifying means located at said constriction, and including a water receptacle, and plates of absorbent material having end portions disposed in the water of said receptacle and having the remaining portions projecting into the air stream passing through said constriction; an outlet chamber having positioned therein a suction fan for inducing passage of air through said cabinet, and discharging the same from said cabinet outlet, heating means for heating said air prior to discharge from said outlet; and means at said cabinet outlet for diverting air issuing from said outlet in a variety of directions.

3. An air conditioning apparatus comprising a casing having walls and an air inlet and an air outlet, means for purifying air disposed within said casing, said means for purifying air comprising a filter for catching foreign substances disposed within said casing, a filter for deodorizing air disposed within said casing between the first named filter and said air outlet and spaced from said first named filter, and means for sterilizing air disposed within said casing between the second named filter and said air outlet and spaced from said second named filter, a partition positioned within said casing between said means for sterilizing air and said air outlet and spaced from said means for sterilizing air, said partition and the adjacent walls of said casing defining an opening of a smaller area than said air inlet, means for humidifying air disposed within said casing and in said opening, means for heating air disposed within said casing between said means for humidifying air and said air outlet and spaced from said means for humidifying air, and means for inducing passage of air through said casing.

JOHN R. RAUHUT.

(References on following page)

References Cited in the file of this patent

UNITED STATES PATENTS

| Number | Name | Date |
|---|---|---|
| 1,239,634 | Stuart | Sept. 11, 1917 |
| 1,589,428 | Rosenow | June 22, 1926 |
| 1,885,142 | Reese et al. | Nov. 1, 1932 |
| 2,047,844 | Wehner | July 14, 1936 |
| 2,104,135 | Morrill | Jan. 4, 1938 |
| 2,117,570 | Philipp | May 17, 1938 |
| 2,183,387 | Anderson | Dec. 12, 1939 |
| 2,277,552 | Kneedler | Mar. 24, 1942 |
| 2,335,056 | Grison | Nov. 23, 1943 |
| 2,347,954 | Kiely | May 2, 1944 |
| 2,359,057 | Skinner | Sept. 26, 1944 |
| 2,389,698 | Stowell | Nov. 27, 1945 |
| 2,430,861 | Carpenter | Nov. 18, 1947 |